United States Patent
Kuriyama et al.

(10) Patent No.: US 6,589,396 B2
(45) Date of Patent: *Jul. 8, 2003

(54) METHOD FOR TREATING COLORED LIQUID AND APPARATUS FOR TREATING COLORED LIQUID

(75) Inventors: Akira Kuriyama, Atsugi (JP); Yasutsugu Yamada, Yokohama (JP); Etsuko Sugawa, Atsugi (JP); Kinya Kato, Atsugi (JP); Masanori Sakuranaga, Atsugi (JP); Takeshi Imamura, Chigasaki (JP); Yuji Kawabata, Isehara (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/339,939

(22) Filed: Jun. 25, 1999

(65) Prior Publication Data

US 2002/0008013 A1 Jan. 24, 2002

(30) Foreign Application Priority Data

Jun. 26, 1998 (JP) ............................................ 10-179951

(51) Int. Cl.[7] .................................................. C07C 1/00
(52) U.S. Cl. .............................. 204/157.15; 204/158.2; 204/158.21
(58) Field of Search ......................... 204/157.15, 158.2, 204/158.21

(56) References Cited

U.S. PATENT DOCUMENTS

| | | | | |
|---|---|---|---|---|
| 3,943,044 A | * | 3/1976 | Fenn, III et al. ............. | 205/701 |
| 4,175,964 A | * | 11/1979 | Uchida et al. ............... | 430/253 |
| 4,761,208 A | * | 8/1988 | Gram et al. .................. | 204/95 |
| 4,836,929 A | * | 6/1989 | Baumann et al. ........... | 210/638 |
| 5,308,507 A | * | 5/1994 | Robson ....................... | 210/748 |
| 5,770,033 A | * | 6/1998 | Murphy et al. .............. | 205/464 |
| 5,832,361 A | * | 11/1998 | Foret .......................... | 422/186 |
| 5,833,830 A | * | 11/1998 | Gonzalez Domiguez et al. | 205/337 |
| 6,042,698 A | * | 3/2000 | Beckett et al. ......... | 204/158.21 |
| 6,045,707 A | * | 4/2000 | Scrudato et al. ............. | 210/748 |

FOREIGN PATENT DOCUMENTS

| | | |
|---|---|---|
| DE | 43 30 518 | 3/1995 |
| JP | 5-115879 | 5/1993 |
| JP | 8-281271 | 10/1996 |
| JP | 9-239383 | 9/1997 |

OTHER PUBLICATIONS

Japan Society of Water Environment, Kansai Branch, "Present Status of Groundwater/Soil Contamination and Their Management",(1995) pp. 220–227 (with English Translation). No month available.

(List continued on next page.)

Primary Examiner—James J. Seidleck
Assistant Examiner—Thao Tran
(74) Attorney, Agent, or Firm—Fitzpatrick, Cella, Harper & Scinto

(57) ABSTRACT

A process for treating colored liquid comprises a step of contacting a colored liquid and functional water generated by electrolysis of a water solution of an electrolyte under light irradiation, to decolorize efficiently and stably to a low chromaticity.

29 Claims, 6 Drawing Sheets

OTHER PUBLICATIONS

Senshoku Kenkyu, (Researches On Dyeing), "Electrolytic Processing of Waste Water Discharged From Dyeing Plant", vol. 40, No. 2 (1996). No month available.

Mizushori Gijutsu, (Water Processing Technology), "Electrolytic Oxidizing Method", vol. 37, No. 5 (1966). No month available.

Patent Abstracts of Japan, vol. 1999, No. 063, Jun. 30, 1999 (with respect to JP 11–57718 of Mar. 2, 1999).

Patent Abstracts of Japan, vol. 1996, No. 122, Dec. 26, 1996 (with respect to JP 8–197048 of Aug. 6, 1996).

Patent Abstracts of Japan, vol. 199, No. 607, Jul. 31, 1996 (with respect to JP 8–71565 of Mar. 19, 1996).

Patent Abstracts of Japan, vol. 1996, No. 603, Mar. 29, 1996 (with respect to JP 7–299474 of Nov. 14, 1995).

Patent Abstracts of Japan, vol. 018, No. 680 (C–1291), Dec. 21, 1994 (with respect to JP 6–269779 of Sep. 27, 1994).

Patent Abstracts of Japan, vol. 018, No. 601 (C–1274), Nov. 16, 1994 (with respect to JP 6–226259 of Aug. 16, 1994).

Database WPI, Derwent Publications Ltd., AN 1994–299029, XP002116649 (with respect to JP 6–226259 of Aug. 16, 1994).

* cited by examiner

METHOD FOR TREATING COLORED LIQUID AND APPARATUS FOR TREATING COLORED LIQUID

BACKGROUND OF THE INVENTION

1. Field of the Invention

This invention relates to a method for treating colored liquid such as a solution containing dyes, waste water from the dyeing industry and waste ink from ink-jet printers.

2. Related Background Art

Dyes and waste water from the dyeing industry are generally treated by means of a combined process of aggregation/precipitation or pressure flotation and activated sludge treatment to reduce chromaticity, BOD and COD thereof. However, the decolorizing effect of such a process is far from satisfactory in spite of the large scale facilities and long processing time, hence the waste water treated with the process still contains dyes to a considerable extent, and may damage the scenic beauty of rivers and the productivity of living things in the river water as dyes in the water will block out the light transmission. In recent years, the above process is further combined with electrolysis, a tertiary treatment using active carbon or an oxidizing agent or dilution with water to improve the decolorizing effect. However, a process combining aggregation/precipitation and the use of active carbon for adsorbing dyes for the purpose of removal/decolorization of dyes is costly and not very effective particularly in a low dye concentration range because dyes can hardly be adsorbed and removed in such a range.

One of the other methods attracting attention in recent years and providing a subject for technological research and development is an electrolysis/oxidation process utilizing electrochemical reaction. It is a process of decolorizing dyes in waste water in an electrolytic cell through electrolysis/oxidation. For example, "Dyeing Research", vol. 40, No. 2 (1996) p.19 and Japanese patent Applications Laid-Open Nos. 5-115879 and 8-281271 describe techniques using such a process. However, all the proposed techniques requires a large treatment cost and hence there is still a strong demand for a novel method and a novel apparatus that can decolorize dyes effectively and efficiently.

Other known techniques for decolorizing colored liquid include the use of an apparatus for decolorizing dyes by means of ozone obtained by irradiating oxygen with ultraviolet rays (Japanese Patent Application Laid-Open No. 9-239383) and that of an apparatus for decolorizing colored liquid by adding an additive thereto and irradiating it with ultraviolet rays. However, both of them require UV light of high energy with a wavelength lower than 300 nm, so that a material that does not transmit ultraviolet light such as glass or plastic cannot be used for such an apparatus, requiring a vessel made of an unusual material such as quartz and a special light source for UV light.

SUMMARY OF THE INVENTION

As a result of intensive research for solving the above identified problems, the inventors of the present invention have found that a dye solution can be decolorized quickly by contacting the dye solution with functional water obtained by electrolysis of water containing an electrolyte, under irradiation with light.

The present invention is based on the novel findings and an object of the present invention is to provide a simple method for efficiently and stably decolorizing colored liquid to a low concentration range.

Another object of the invention is to provide a method of decolorizing colored liquid reliably in a short period of time.

According to a first aspect of the present invention, there is provided a method for decolorizing colored liquid comprising the steps of: providing functional water by electrolysis of water containing an electrolyte; and bringing a colored liquid into contact with the functional water under irradiation with light to reduce chromaticity of the colored liquid.

According to another aspect of the invention, there is provided an apparatus for decolorizing colored liquid, comprising a container provided with a pair of electrodes, a power source for applying a voltage to the electrodes, a means for supplying water containing an electrolyte to the container, a light irradiation means and a means for supplying colored liquid to the container.

According to still another aspect of the invention, there is also provided an apparatus for decolorizing colored liquid comprising a decomposition treatment container, a means for supplying functional water obtained by electrolysis of water containing an electrolyte to the decomposition treatment container, a means for supplying a colored liquid to be decomposed to the decomposition treatment container and a means for irradiating the decomposition treatment container with light.

The reason why various organic compounds are acceleratingly decomposed when irradiated with light in the presence of functional water is not clear. However, the inventors presume that the water produced by electrolysis of water containing an electrolyte such as sodium chloride typically contains hypochlorous acid or hypochlorite ions, which then produce chlorine radicals, hydroxyl group radicals or superoxides by the action of light to promote the above decomposition reaction.

Japanese Patent Application Laid-Open No. 8-281271 discloses a process for decomposing a dye contained in dyeing water in an electrolytic vessel by means of hypochlorous acid and/or hypochlorite ions generated by electrolysis. "MIZUSHORI GIJUTSU (Water Treatment Technology)", vol. 37, No. 5 (1996), p.33 discloses a process for treating dyeing disposal water, by using an electrochemical reaction. That is, it discloses a process for decomposing dyes in the dyeing waste by using an indirect electrolysis, generating an oxidizing agent by electrolysis, indirectly decomposing the dyes by the oxidizing effect thereof. It also discloses that an example of the oxidizing agent includes hypochlorous acid, which is generated through a reaction of chlorine gas produced at the anode and hydroxy ions produced at the cathode when sodium chloride is added to the disposal water and subjected to electrolysis. However, neither of the journal article or the patent document cited above describes or suggests that the colored liquid is decolorized efficiently by bringing the colored liquid into contact with functional water under irradiation with light.

DETAILED DESCRIPTION OF THE PREFERRED EMBODIMENTS

-First Mode of Carrying out the Invention-

Figure 1:
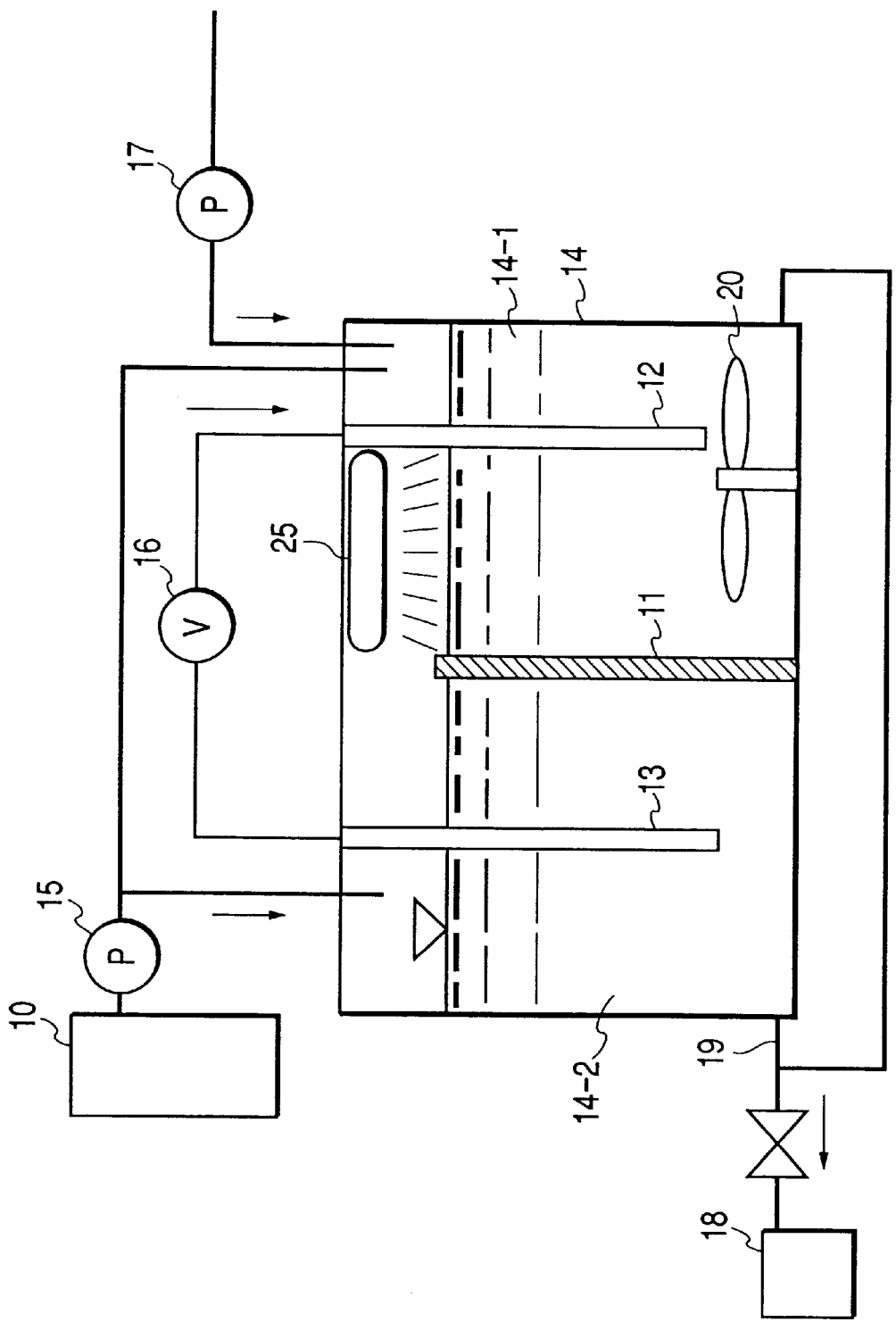
FIG. 1 is a schematic diagram of an embodiment of the apparatus for decolorizing colored liquid according to the invention.

FIG. 1 is a schematic block diagram of an embodiment of the apparatus for decolorizing colored liquid containing dyes according to the invention. Referring to FIG. 1, a container for electrolytic treatment 14 is divided by ion exchange membrane 11 into region 14-1 containing an anode 12 and region 14-2 containing a cathode 13. Water containing an electrolyte dissolved in a high concentration is supplied from an aqueous electrolyte solution storage tank 10 to each of the regions 14-1 and 14-2 by means of a pump 15 until the electrolytic treatment container 14 is filled with the water, and the functional water is produced in the anode-side 14-1 by imposing electric power from an electric source 16 on the electrodes 12 and 13. On the other hand, colored liquid, for example, an aqueous solution of a dye, is supplied to the anode side 14-1 of the electrolytic treatment container 14 by means of a supply pump 17 at a desired flow rate and the colored liquid and the functional water are mixed by a stirrer 20. Meanwhile, the mixture of the functional water and the colored liquid is irradiated with light emitted from a light irradiation unit 25 arranged within the electrolytic treatment container 14. Then, the colored liquid is decolorized by the contact with the functional water produced near the anode and by light irradiation. The functional water used for treating the colored liquid is discharged from the anode side of the electrolytic treatment container 14 through a discharge pipe 19 to a tank 18. The basic functional water produced at the anode side 14-2 of the electrolytic treatment container 14 is also discharged to the tank 18 by way of the discharge pipe 19.

[Objects of Decolorization]

Non-limiting examples of the colored liquid include dyeing water, waste water of the dyeing industry and inks. The method and apparatus for treating colored liquid are effective for decolorizing colored liquid containing and colored by azo dyes, anthraquinone dyes, phthalocyanine dyes, indigoid dyes, carbonium dyes, quinone-imine dyes and/or methine dyes. The invention is particularly effective on decolorization of the colored liquid containing azo dyes and/or phthalocyanine dyes.

[Functional Water—Acidic Water]

Functional water can be obtained near the anode when one or more electrolytes (e.g., sodium chloride and potassium chloride) are dissolved into the source water and the solution is subjected to electrolysis in a water tank provided with a pair of electrodes. Functional water as used herein refers to water characterized by a $\log_{10}$ hydrogen ion concentration (pH value) between 1 and 4, an oxidation-reduction potential between 800 mV and 1,500 mV when measured by using platinum and silver—silver chloride as the working and the reference electrodes respectively, and a chlorine concentration between 5 mg/liter and 150 mg/liter.

For preparing functional water having the above properties, the concentration of electrolyte, for example, sodium chloride, in the source water prior to electrolysis is preferably between 20 mg/l and 2,000 mg/l and the electrolytic current is preferably between 2 A and 20 A. To obtain such functional water, any commercially available strongly acidic electrolyzed water generator (e.g., Oasys Bio HALF: trade name, a product of ASAHI GLASS ENGINEERING COMPANY., or Strong Electrolyzed Water Generator Model FW-200: trade name, a product of AMANO) may be used.

Undesired mixing of the acidic water produced in the proximity of the anode and the alkaline water produced in the proximity of the cathode can be prevented by providing a diaphragm between the paired electrodes, to effectively obtain acidic water that can efficiently decompose the halogenated aliphatic hydrocarbon compounds or the aromatic compounds. Such a diaphragm may suitably be an ion exchange membrane. The ion exchange membrane suitable for the diaphragm is one which restrains the movement of the electrolyte solution in the proximity of the cathode or the anode toward the other electrode, and makes irreversible the movement of positive ions (e.g., $Na^+$, $Ca^{2+}$, $Mg^{2+}$, $K^+$, etc.) from the anode side toward the cathode side and that of negative ions (e.g., $Cl^-$, $SO_4^{2-}$, $HCO_{3-}$, etc.) from the cathode side toward the anode side.

Functional Water Prepared not Using a Diaphragm, or Mixed Functional Water

Alternatively, functional water may be obtained near the anode of an electrolytic apparatus not having a diaphragm. For example, functional water, of which oxidation-reduction potential is 300–1,100 mV, chlorine concentration is 2–100 mg/l and pH is 4 –10, may also suitably be used for decomposing organic compounds depending on the concentration. Such functional water may also be obtained by mixing the acidic water and the alkaline water produced by electrolysis in an electrolytic system having a diaphragm between the paired electrodes. If such is the case, the mixing ratio of acidic water and alkaline water is preferably between 1:0 and 1:1 by volume. The use of such electrolyzed water is advantageous for decolorizing colored liquid in view of cost reduction. It is preferable to provide a agitating means 20 in the electrolytic treatment container 14-1 to promote the contact/reaction, where the dye or colored waste water from the dyeing industry contacts the functional water generated near the anode.

Light Source

Irradiation light for decomposing organic compounds in functional water preferably has a wavelength between 300 and 500 nm, more preferably between 350 and 450 nm. From the viewpoint of decomposition efficiency, the intensity of irradiation to a mixture of functional water and the organic compound to be decomposed is preferably between 10 $\mu W/cm^2$ and 10 $mW/cm^2$, more preferably between 50 $\mu W/cm^2$ and 5 $mW/cm^2$. For example, light from a light source with a peak wavelength of 365 nm and an intensity of several hundred μW/cm² (as measured in a wavelength range between 300 nm and 400 nm) is sufficient for decomposing the target substance in practical applications.

Either natural light (e.g., sunlight) or artificial light (from a mercury lamp, a black lamp or a color fluorescent lamp) can be used for the purpose of the invention.

The mixture of the functional water and the target substance can be irradiated either directly or through a transparent container typically made of glass or a plastic material. Functional water can be irradiated after or during the production process thereof. Anyhow, in order to accelerate the decomposition remarkably, irradiation is desirably carried out while the target substance is in contact with the functional water. In the embodiments of the present invention using functional water, it is not necessary to use beams that may adversely affect the human body (e.g., UV light of a wavelength of 250 nm).

Reaction between the functional water and the colored liquid is promoted by light irradiation as mentioned above. As described above, functional water produced by electrolysis of water containing electrolytes such as sodium chloride contains hypochlorous acid or hypochlorite ions, which probably generate chlorine radicals, hydroxyl radicals and/or superoxides by the action of light to decompose the dyes in the colored waste. The quantity of hypochlorous acid in the functional water, which is generated by electrolysis in the proximity of the anode and probably participates in the decomposition process of the target substance, can be determined by pH and the chlorine concentration.

Additionally, the functional water generated by electrolysis can be diluted with pure water or some other diluent to be used for decomposing the target substance. Alternatively, the functional water of the same characteristic properties as such diluted functional water may be prepared directly.

In this embodiment, by using water already containing an electrolyte, such as sea water, colored liquid can be decolorized more economically.

Another Embodiment

Figure 2:
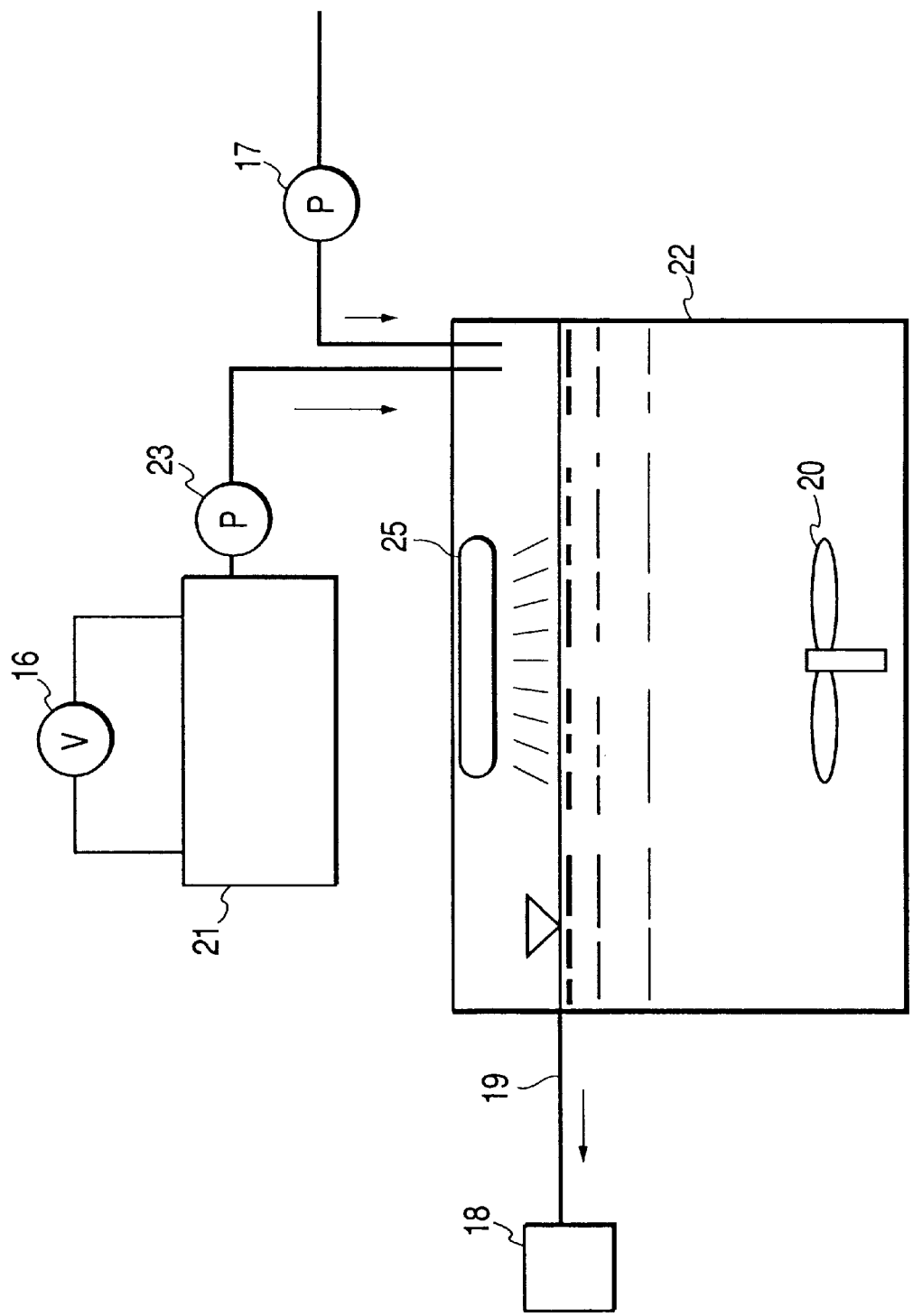
FIG. 2 is a schematic diagram of another embodiment of the apparatus for decolorizing colored liquid according to the invention.

FIG. 2 is a schematic block diagram of another embodiment of the apparatus.

Referring to FIG. 2, a desired amount of functional water, either an acidic functional water or a mixture of acidic and alkaline functional water produced in a functional water generating unit 21, is supplied to a decolorizing treatment container 22 by way of a pump 23. A colored solution such as a dye solution to be treated is also introduced into the container 22. They are then agitated by means of an agitator 20 in the container 22 to promote the contact therebetween, while the inside of the container 22 is irradiated with light emitted from a light irradiation unit 25. As a result, the colored liquid is decolorized and the treatment is completed. Then both of the used functional water and the treated colored liquid are discharged into a tank 18 through a discharge pipe 19. In this embodiment where the functional water generated in the functional water generating unit 21 is introduced into a treatment container 22, the unit is free from dye contamination. All or part of the functional water used and discharged through the discharge pipe 19 may be fed back to the functional water generating unit 21 and used as the source water for preparing functional water.

Thus, according to the invention, dye-containing colored liquid or waste water from the dyeing industry can be decolorized safely and stably at low cost.

EXAMPLES

Now, the present invention will be described by way of examples, which by no means limit the scope of the present invention.

Example 1

Decolorization of Yellow Ink for Ink-Jet Printing by Acidic Functional Water and Light Irradiation To begin with, acidic functional water was prepared by means of a commercially available functional water generating apparatus (OASYS Bio HALF: tradename, a product of ASAHI GLASS ENGINEERING CO.) having a diaphragm between the anode and the cathode. The pH and the oxidation-reduction potential of functional water were measured by means of a pH meter (TCX-90i and KP900-2N: tradename, a product of Toko Chemical Laboratories Co., Ltd.) and an electroconductivity meter (TCX-90i and KM900-2N: tradename, a product of Toko Chemical Laboratory), respectively, whereas the chlorine concentration was determined by using a chlorine test paper (ADVANTEC: tradename, a product of Toyo Roshi Kaisha, Ltd.). As a result, functional water of pH 2.1, oxidation-reduction potential 1,150 mV and residual chlorine concentration 54 mg/l was prepared for this example by electrolyzing water containing an electrolyte, sodium chloride in this case, at a concentration of 1,000 mg/l.

Then, into a vial with a capacity of 27.5 ml, 27 ml of functional water was added, to which a yellow ink was added to 200 ppm. The ink contains a yellow azo pigment and was contained in the yellow ink cartridge (BJ Cartridge BJI-201Y: tradename, a product of Canon) for an ink jet printer. Then, the vial was hermetically sealed with a butyl rubber cap and an aluminum seal. It had been confirmed that the vial would not transmit light of a wavelength less than 300 nm. Then, the vial was left standing outdoors on a fine day under direct sunlight where the average temperature was 15° C. When measured by means of a UV power meter (SUV300T: tradename, a product of TORAY), the intensity of light at the spot was between 0.4 and 1.2 mW/cm².

Figure 3:
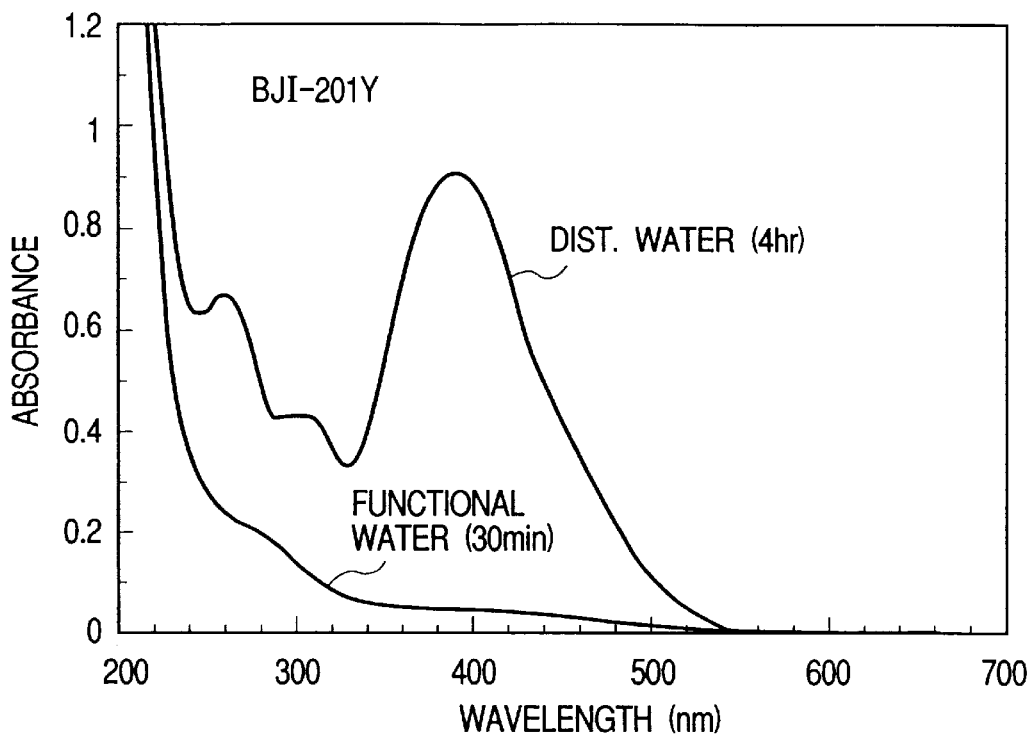
FIG. 3 is a graph illustrating the absorbance of a yellow ink solution discharged from an ink-jet printer and mixed with acidic functional water under light irradiation in Example 1.

About 30 minutes thereafter, when the liquid in the vial became substantially transparent, the absorbance of the liquid in the vial was measured using a spectrophotometer (UV3100: tradename, a product of Shimadzu Seisakusho). FIG. 3 shows the result. It was found that the colored liquid could be sufficiently decolorized as a result of contact with functional water under light irradiation.

In a control experiment using distilled water in place of functional water, the pigment was not decolorized after four hours of light irradiation. FIG. 3 also shows the result of the control experiment.

Example 2

Figure 4:
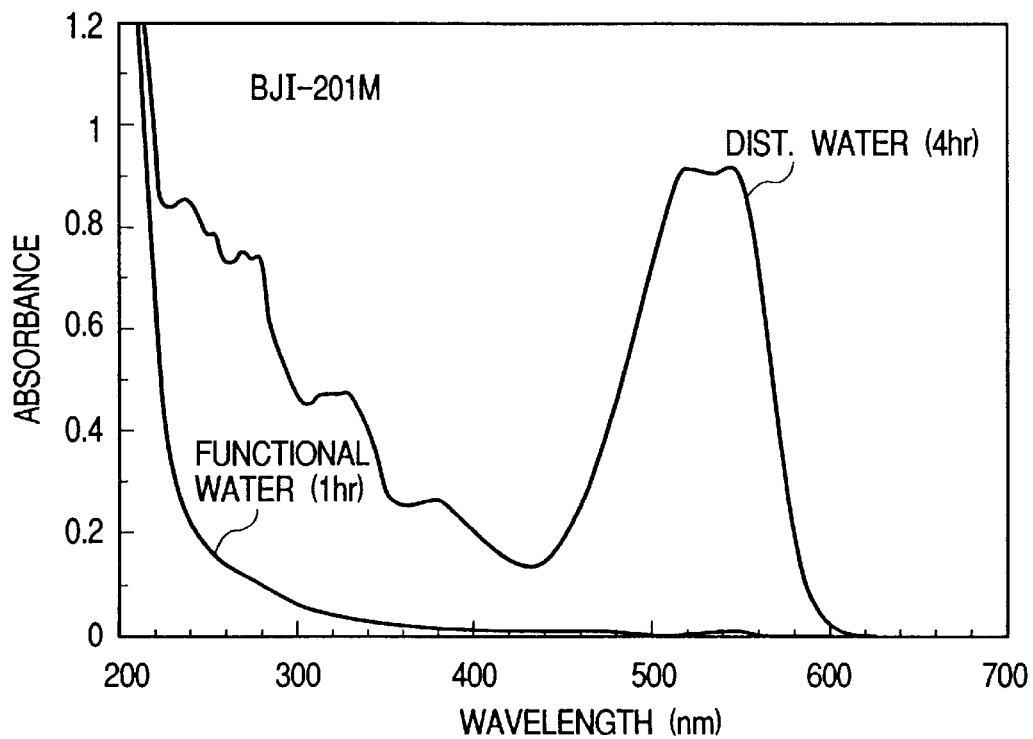
FIG. 4 is a graph illustrating the absorbance of a magenta ink solution discharged from an ink-jet printer and mixed with acidic functional water under light =,irradiation in Example 2.

Decolorization of Magenta Ink for Ink-Jet Printing by Acidic Functional Water and Light Irradiation The procedure of Example 1 was followed except that a magenta ink was used instead of the yellow ink, at an initial concentration of 150 ppm, and irradiation was carried out for one hour. The magenta ink contained a purple azo pigment and was contained in a magenta ink cartridge (BJ Cartridge BJI-201M: tradename, a product of Canon). FIG. 4 shows the result. It was found that the colored liquid could be sufficiently decolorized by being in contact with functional water under light irradiation.

In a control experiment using distilled water in place of functional water, the pigment was not decolorized after four hours of light irradiation. FIG. 4 also shows the result of the control experiment.

Example 3

Figure 5:
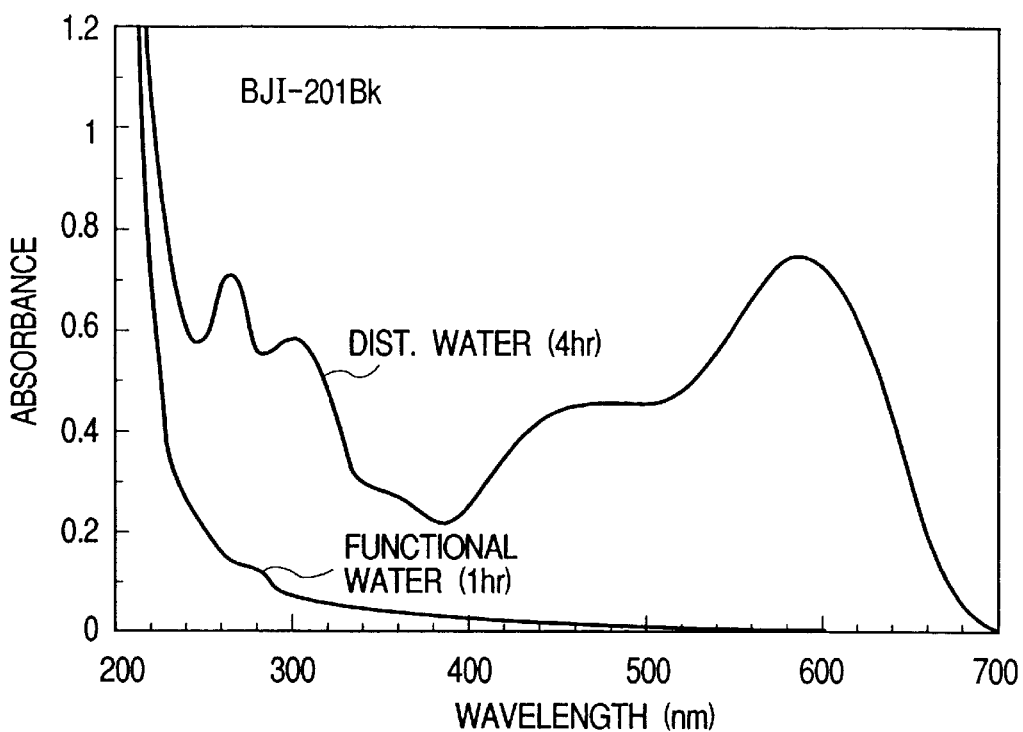
FIG. 5 is a graph illustrating the absorbance of a black ink solution discharged from an ink-jet printer and mixed with acidic functional water under light irradiation in Example 3.

Decolorization of Black Ink for Ink-Jet Printing by Acidic Functional Water and Light Irradiation The procedure of Example 1 was followed except that a black ink was used instead of the yellow ink, with an initial concentration of 150 ppm, and irradiation was carried out for one hour. The black ink contained a black azo pigment and was contained in a black ink cartridge (BJ Cartridge BJI-201Bk: tradename, a product of Canon Inc.). FIG. 5 shows the result. It was found that the colored liquid could be sufficiently decolorized within about one hour, by being in contact with functional water under light irradiation.

In a control experiment using distilled water in place of functional water, the pigment was not decolorized after four hours of light irradiation. FIG. 5 also shows the result of the control experiment.

Figure 6:
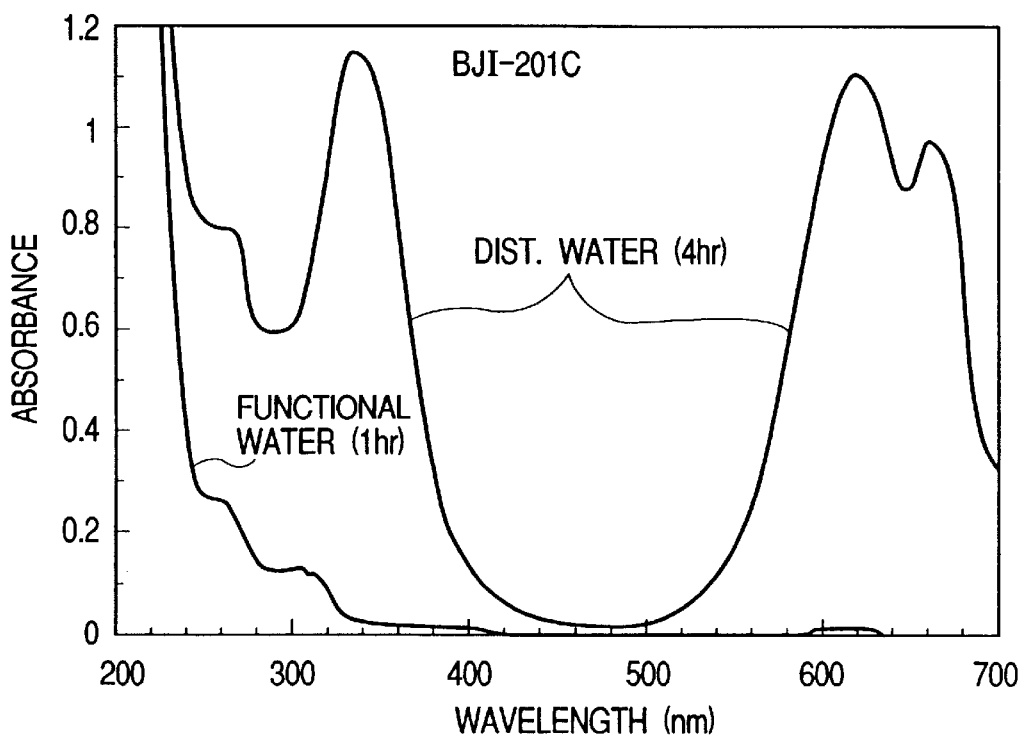
FIG. 6 is a graph illustrating the absorbance of a cyan ink solution discharged from an ink-jet printer and mixed with acidic functional water under light irradiation in Example 4.

Example 4
Decolorization of Cyan Ink for Ink-Jet Printing by Acidic Functional Water and Light Irradiation The procedure of Example 1 was followed except that a cyan ink was used instead of the yellow ink, with an initial concentration of 150 ppm, and irradiation was carried out for one hour. The cyan ink contained a blue phthalocyanine pigment and was contained in a cyan ink cartridge (BJ Cartridge BJI-201C: tradename, a product of Canon). FIG. 6 shows the result. It was found that the colored liquid could be sufficiently decolorized within about one hour, by contacting it with functional water under light irradiation.

In a control experiment using distilled water in place of functional water, the pigment was not decolorized after four hours of light irradiation. FIG. 6 also shows the result of the control experiment.

Example 5
Decolorization of Yellow Ink for Ink-Jet Printing by Mixed Functional Water and Light Irradiation The electrolyzed water-generating apparatus of Example 1 was used to produce acidic functional water at anode side and alkaline functional water at cathode side. The acidic water was of pH 2.1, oxidation-reduction potential 1,150 mV, and chlorine concentration 54 mg, and the basic functional water was of pH 11.5, oxidation-reduction potential −850 mV, and chlorine concentration of 10 mg/l. Then, the acidic functional water and the basic functional water were mixed in a 1:1 ratio to prepare mixed functional water 1 of which the pH was 7.1, oxidation-reduction potential was 400 mV, and residual chlorine concentration was 42 mg/l.

Then, into a vial with a capacity of 27.5 ml, 27 ml of the above mixed functional water 1 was added, to which a yellow ink was added to 150 ppm. The ink contained a yellow azo pigment and was contained in the yellow ink cartridge (BJ Cartridge BJI-201Y: tradename, a product of Canon) for an ink jet printer. Then, the vial was hermetically sealed with a butyl rubber cap and an aluminum seal. It had been confirmed that the vial would not transmit light of a wavelength less than 300 nm. Then, the vial was left standing outdoors on a fine day under direct sunlight where the average temperature was 15° C. When measured by means of a UV power meter (SUV300T: tradename, a product of TORAY), the intensity of light at the spot was between 0.4 and 1.2 mW/cm$^2$.

Figure 7:
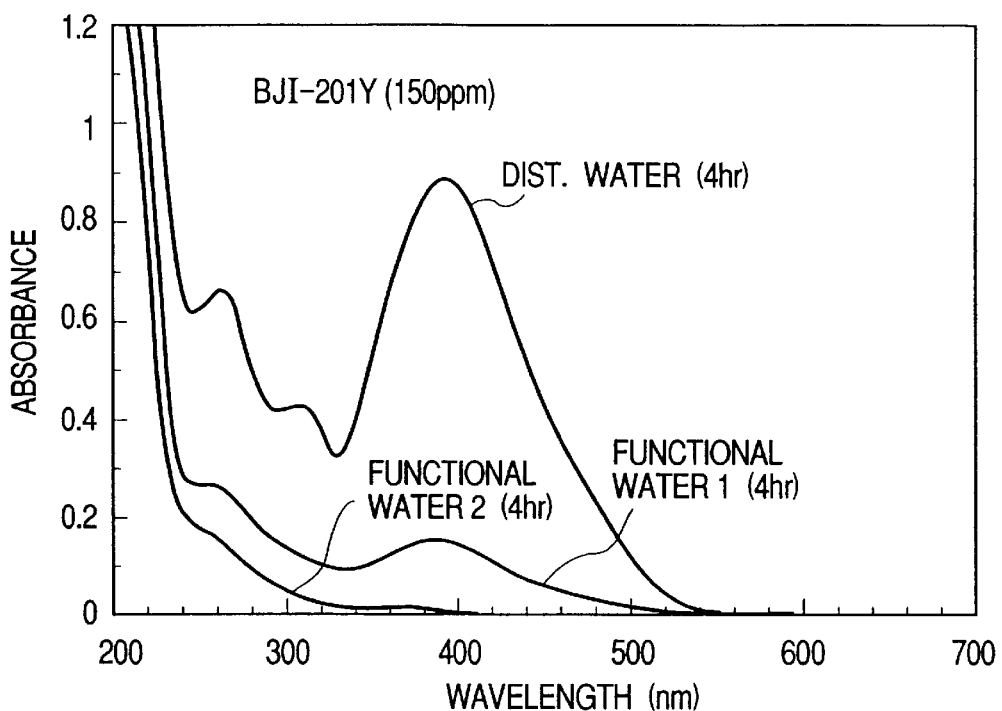
FIG. 7 is a graph illustrating the absorbance of a yellow ink solution discharged from an ink-jet printer and mixed with mixed functional water under light irradiation in Example 5.

About four hours thereafter, when the liquid in the vial became substantially transparent, the absorbance of the liquid in the vial was measured using a spectrophotometer (UV3100: tradename, a product of Shimadzu Seisakusho). FIG. 7 shows the result. It was found that the colored liquid could be sufficiently decolorized as a result of contact with functional water under light irradiation. When a similar experiment was carried out using mixed functional water 2 (pH 6.5, oxidization-reduction potential 480 mV, residual chlorine concentration 47 mg/l), prepared by mixing the above acidic and alkaline functional water in a 1:0.5 ratio, decolorization treatment was achieved more efficiently than with the functional water 1, as shown FIG. 7.

In a control experiment using distilled water in place of functional water, the pigment was not decolorized after four hours of light irradiation. FIG. 7 also shows the result of the control experiment.

Figure 8:
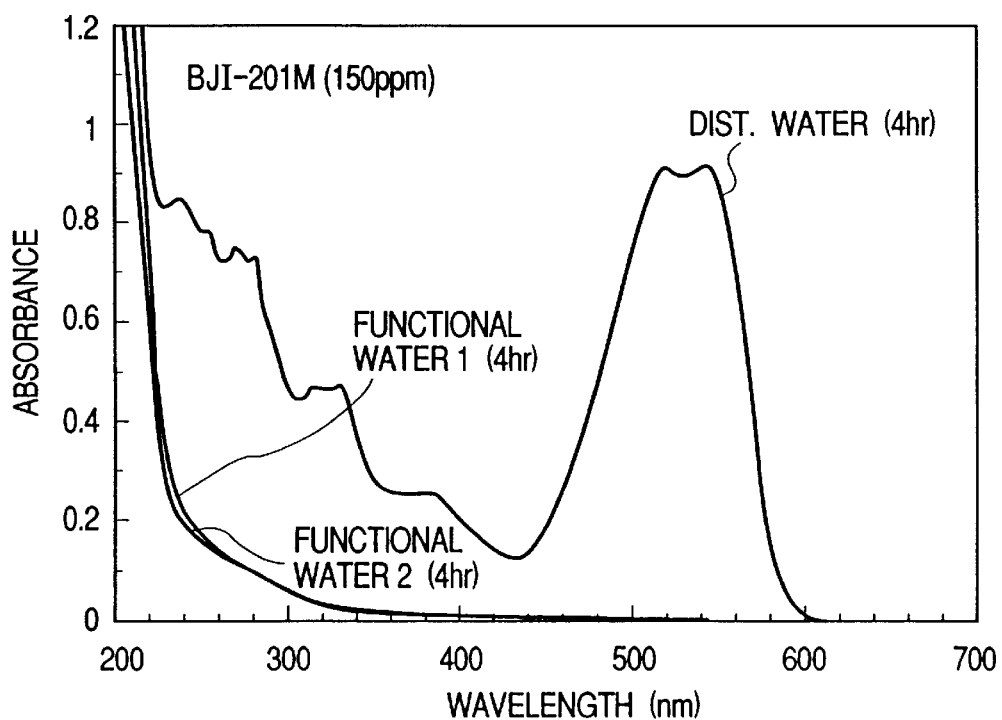
FIG. 8 is a graph illustrating the absorbance of a magenta ink solution discharged from an ink-jet printer and mixed with mixed functional water under light irradiation in Example 6.

Example 6
Decolorization of Magenta Ink for Ink-Jet Printing by Mixed Functional Water and Light Irradiation The procedure of Example 5 was followed except that a magenta ink was used instead of the yellow ink, to evaluate the decolorization effect of two kinds of mixed functional water. The magenta ink contained a purple azo pigment and was contained in a magenta ink cartridge (BJ Cartridge BJI-201M: tradename, a product of Canon). FIG. 8 shows the result. It was found that the colored liquid could be sufficiently decolorized by contacting with mixed functional water under light irradiation.

In a control experiment using distilled water in place of mixed functional water, the pigment was not decolorized after four hours of light irradiation. FIG. 8 also shows the result of the control experiment.

Figure 9:
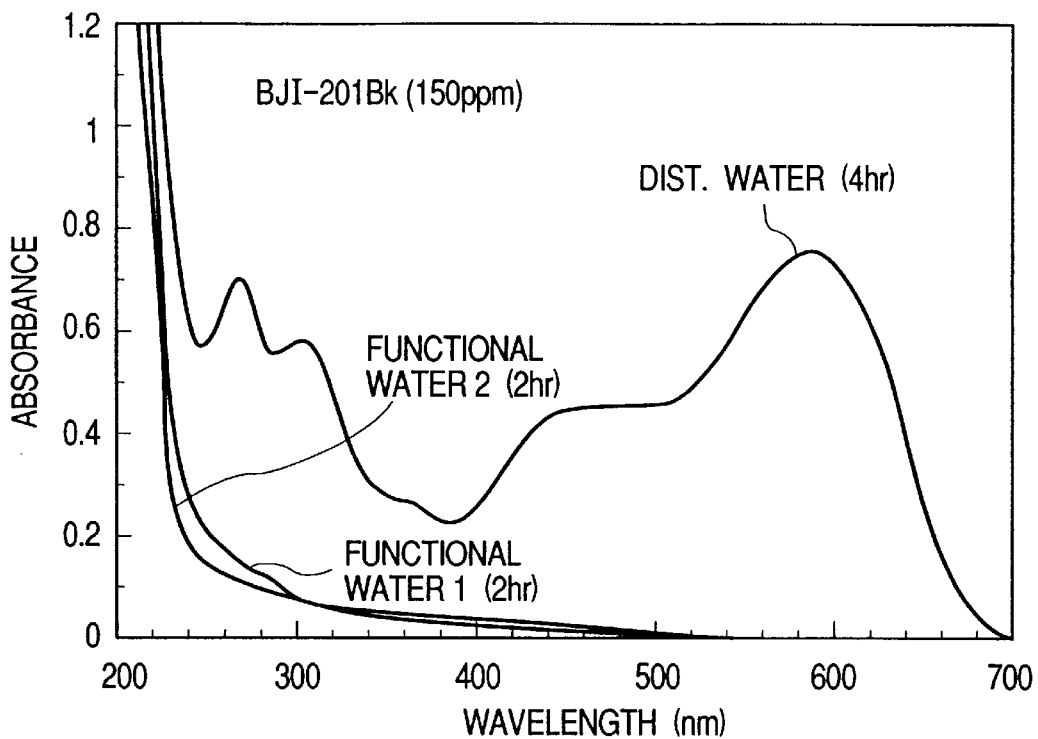
FIG. 9 is a graph illustrating the absorbance of a black ink solution discharged from an ink-jet printer and mixed with mixed functional water under light irradiation in Example 7.

Example 7
Decolorization of Black Ink for Ink-Jet Printing by Mixed Functional Water and Light Irradiation The procedure of Example 5 was followed except that a black ink was used instead of the yellow ink, and the irradiation was carried out for two hours, to evaluate the decolorization effect of two kinds of mixed functional water. The black ink contained a black azo pigment and was contained in a black ink cartridge (BJ Cartridge BJI-201Bk: tradename, a product of Canon). FIG. 9 shows the result. It was found that the colored liquid could be sufficiently decolorized within about one hour, by contacting with functional water under light irradiation.

In a control experiment using distilled water in place of functional water, the pigment was not decolorized after four hours of light irradiation. FIG. 9 also shows the result of the control experiment.

Figure 10:
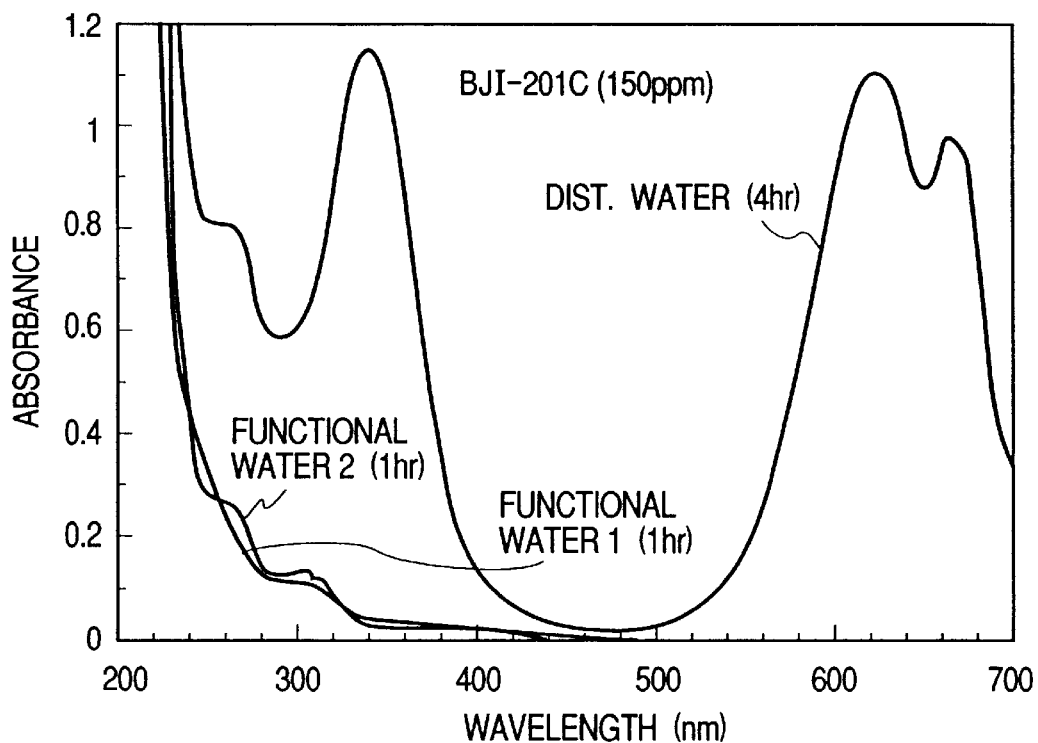
FIG. 10 is a graph illustrating absorbance of a cyan ink solution discharged from an ink-jet printer and mixed with mixed functional water under light irradiation in Example 8.

Example 8
Decolorization of Cyan Ink for Ink-Jet Printing by Mixed Functional Water and Light Irradiation The procedure of Example 5 was followed except that a cyan ink was used instead of the yellow ink, and irradiation was carried out for one hour, to evaluate the decolorization effect of two kinds of mixed functional water. The cyan ink contained a blue phthalocyanine pigment and was contained in a cyan ink cartridge (BJ Cartridge BJI-201C: tradename, a product of Canon). FIG. 10 shows the result. It was found that the colored liquid could be sufficiently decolorized within about one hour, by contacting with functional water under light irradiation.

In a control experiment using distilled water in place of mixed functional water, the pigment was not decolorized after four hours of light irradiation. FIG. 10 also shows the result of the control experiment.

Example 9
Batch Decolorization Treatment of Dye-Containing Waste Water by Means of an Electrolyzing/Decolorizing Unit with a Halogen Lamp Batch-wise decolorization of a dye-containing waste was conducted using a unit as shown in FIG. 1. An electrolyzed water-generating unit of a commercially available electrolyzed water generator (Strongly Electrolyzed Water Generator Model FW-200: tradename, a product of AMANO) was used as the electrolytic treatment container 14 in this example. An agitator 20 was arranged at the anode side to promote the contact of the artificial dye-containing waste water and functional water. A halogen lamp (Techno Light KLS-2150: tradename, a product of KENKO) was arranged as the light irradiation unit 25 above the water surface of the anode side of the decolorizing treatment container (14-1).

A composite dye waste of the following was artificially prepared and subjected to a decolorizing experiment in this example.

Composition of Dyes:

| | |
|---|---|
| Black Ink Containing Black Azo Pigment in BJ Cartridge BJI-201Bk | 3,000 ppm |
| Yellow Ink Containing Yellow Azo Pigment in BJ Cartridge BJI-201Y | 4,000 ppm |
| Magenta Ink Containing Purple Azo Pigment in BJ Cartridge BJI-201M | 3,000 ppm |
| Cyan Ink Containing Blue Phthalocyanine Pigment in BJ Cartridge BJI-201C | 3,000 ppm |

Subsequently, composite dye waste was supplied to the anode side of the decolorizing treatment container 14-1. On the other hand, water containing sodium chloride at a concentration of 1,000 mg/l was stored in an aqueous electrolyte solution storage tank 10 and supplied to the electrolytic treatment container 14. The supply of water was terminated when the composite dye waste was 10 fold diluted with water, and the halogen lamp was turned on to irradiate the decolorizing treatment container 14-1. The intensity of light measured by means of a UV power meter (SUV300T: tradename, a product of TORAY) was 0.122 mW/cm$^2$ at the water surface. At the same time, power was supplied from a power source 16 to a pair of electrodes 12 and 13 for electrolysis to produce functional water in the proximity of the anode 12, with a supplied electric current of 7 A for 10 min. When this apparatus was operated under the above conditions without the composite dye waste water, it was shown that functional water was prepared, of which the pH was 2.1, the oxidation-reduction potential was 1,150 mV, and residual the chlorine concentration was 54 mg/l. After the treatment, the chromaticity of the waste water discharged from the discharge pipe 19 of the treatment container 14, estimated according to JIS K0101, was 2–4. Thus, the treated waste was decolorized to an extent that it could be discharged outside without any further treatment. Thus, it was proved that the above apparatus can be used to satisfactorily decolorize dye wastes.

Example 10

Batch Decolorization Treatment of Dye-Containing Waste Water by Means of an Electrolytic/Decolorizing Unit with a UV Lamp A decolorizing experiment was conducted in this example in the same manner as in Example 9 except that the halogen lamp for the irradiation unit 25 was replaced by a UV lamp having a wavelength peak at 365 nm (UVGL-58 Type Lamp: tradename, a product of UVP). The intensity of light determined by means of a UV power meter (SUV300T: tradename, a product of TORAY) was 0.4 mW/cm$^2$ at the water surface. After the treatment, the chromaticity of the waste water discharged from the discharge pipe 19 of the container 14, estimated according to JIS K0101, was 2–4. Thus, the treated waste was decolorized to an extent that it could be discharged outside without any further treatment. Thus, it was proved that the above apparatus can be used to satisfactorily decolorize dye wastes.

Example 11

Batch Decolorization Treatment of Dye-Containing Waste Water by Means of an Electrolytic/Decolorizing Unit with a Black Light A decolorizing experiment was conducted in this example in the same manner as in Example 9 except that the halogen lamp for the irradiation unit 25 was replaced by a black fluorescent light (FL10BLB 10 W: tradename, a product of Toshiba). The intensity of light determined by means of a UV Power meter (SUV300T: tradename, a product of TORAY) was 1.2 mW/cm$^2$ at the water surface. After the treatment, the chromaticity of the waste water discharged from the discharge pipe 19 of the container 14, estimated according to JIS K0101, was 2–4. Thus, the treated waste was decolorized to an extent that it could be discharged outside without any further treatment. Thus, it was proved that the above apparatus can be used to satisfactorily decolorize dye wastes.

Example 12

Batch Decolorization Treatment of Dye-Containing Waste Water by Means of an Electrolytic/Decolorizing Unit with a Blue Light Fluorescent Lamp A decolorizing experiment was conducted in this example in the same manner as in Example 9 except that the halogen lamp for the irradiation unit 25 was replaced by a blue light fluorescent lamp (FL20SB, a product of Toshiba). The intensity of light determined by means of a digital UV power meter (Model UVA-365: tradename, a product of NT Corporation) was 0.057 mW/cm$^2$ at the water surface. After the treatment, the chromaticity of the waste water discharged from the discharge pipe 19 of the container 14, estimated according to JIS K0101, was 2–4. Thus, the treated waste was decolorized to an extent that it could be discharged outside without any further treatment. Thus, it was proved that the above apparatus can be used to satisfactorily decolorize dye wastes.

Example 13

Batch Decolorization Treatment of Dye-Containing Waste Water by Means of an Electrolytic/Decolorizing Unit without a Diaphragm A decolorizing experiment was conducted in the same manner as in Example 9 except that the ion exchange membrane 11 in the decolorizing treatment container was removed. Operation was conducted under conditions of electrolyte concentration of 800 mg/l and electric current of 7 A. It was confirmed previously that under these conditions but in the absence of composite dye waste, the functional water obtained was of pH 2.8, an oxidation-reduction potential of 950 mV and a residual chlorine concentration of 35 mg/l. After the treatment, the chromaticity of the waste water discharged from the discharge pipe 19 of the container 14, estimated according to JIS K0101, was 4–7. Thus, the treated waste was decolorized to an extent that it could be discharged outside without any further treatment. Thus, it was proved that the above apparatus not provided with a diaphragm can be used to satisfactorily decolorize dye wastes.

Comparative Example 1

Batch Decolorization Treatment of Dye-Containing Waste Water by Means of an Electrolytic/Decolorizing Unit without Light Irradiation A decolorizing experiment was conducted in the same manner as in Experiment 13 except that no light irradiation to the electrolytic treating container was carried out. The chromaticity of the discharged waste water after treatment, estimated according to JIS K0101, was 20–37. This value means the treated waste should not be discharged outside without further treatment.

Example 14
Batch Treatment of Dye-Containing Waste Water by Means of Electrolytic/Decolorizing Unit Using Sea Water as Electrolyte Solution A decolorizing experiment was conducted in this example by following the procedure of Example 9 except that diluted sea water was used in place of the sodium chloride solution of 1000 mg/l. The sea water of 3.4% salt concentration was diluted with tap water to about 0.1%. It was confirmed previously that under these conditions but in the absence of composite dye waste, the functional water obtained was of pH 2.1, an oxidation-reduction potential of 1150 mV and a residual chlorine concentration of 55 mg/l. After the treatment, the chromaticity of the waste water discharged from the discharge pipe 19 of the container 14, estimated according to JIS K0101, was 2–4. Thus, the treated waste was decolorized to an extent that it could be discharged outside without any further treatment. Thus, it was proved that the diluted sea water can be used as an electrolyte solution to be electrolyzed.

Example 15
Batch Decolorization Treatment of Dye-Containing Waste Water by Means of Decolorizing Unit having a Separate Electrolytic Unit Using Acidic Functional Water and a Halogen Lamp A batch decolorization of dye waste was conducted using an apparatus as shown in FIG. 2. Water containing sodium chloride in a concentration of 1000 mg/l was electrolyzed by means of a commercially available functional water-generating apparatus (OASYS Bio HALF: tradename, a product of ASAHI GLASS ENGINEERING CO.). An agitator 20 was provided to promote the contact of the waste water and functional water under light irradiation. A halogen lamp (Techno Light KLS-2150: tradename, a product of Kenko) was arranged in the treatment container 22 as a light irradiation unit 25. Then, the same waste water containing composite dyes as used in Example 9 was supplied to the treatment container 22 by means of the pump 17. On the other hand, functional water was prepared at the anode side of the functional water generating unit 21. Then, acidic functional water (pH 2.1, oxidation-reduction potential 1,150 mV, residual chlorine concentration 55 mg/l), which was generated in the proximity of the anode in the generator 21, was supplied to the treatment container 22 by means of the pump 23 but the supply of water was terminated when the waste water was diluted 10 fold. Then, the halogen lamp was turned on and the water in the container was agitated and mixed well by the agitator 20, and the operation was carried out for an hour. The intensity of irradiation light, determined by means of a UV power meter (SUV300T: tradename, a product of TORAY), was 0.122 mW/cm$^2$ at the water surface. After the treatment, the chromaticity of the waste water discharged from the discharge pipe 19, estimated according to JIS K0101, was 2–4. Thus, the treated waste was decolorized to an extent that it could be discharged outside without any further treatment. Thus, it was proved that the apparatus can sufficiently decolorize dye waste.

Example 16
Batch Decolorization Treatment of Dye-Containing Waste Water by Means of Decolorizing Unit having a Separate Electrolytic Unit Using Acidic Functional Water and a UV Lamp A decolorizing experiment was conducted in this example following the procedure of Example 15 except that the halogen lamp as the light irradiation unit 25 was replaced by a UV lamp having a wavelength peak at 365 nm (UVGL-58: tradename, a product of UVP). The intensity of irradiation light, determined by means of a UV power meter (SUV300T: tradename, a product of TORAY), was 0.4 mW/cm$^2$ at the water surface. After the treatment, the chromaticity of the waste water discharged from the discharge pipe 19, estimated according to JIS K0101, was 2–4. Thus, the treated waste was decolorized to an extent that it could be discharged outside without any further treatment. Thus, it was proved that the apparatus can sufficiently decolorize dye waste.

Example 17
Batch Decolorization Treatment of Dye-Containing Waste Water by Means of Decolorizing Unit having a Separate Electrolytic Unit Using Acidic Functional Water and a Black Lamp A decolorizing experiment was conducted in this example by following the procedure of Example 15 except that the halogen lamp as the light irradiation unit 25 was replaced by a black fluorescent lamp (tradename: FL10BLB 10 W, a product of Toshiba). The intensity of irradiation light, determined by means of a UV power meter (SUV300T: tradename, a product of TORAY), was 1.2 mW/cm$^2$ at the water surface. After the treatment, the chromaticity of the waste water discharged from the discharge pipe 19, estimated according to JIS K0101, was 2–4. Thus, the treated waste was decolorized to an extent that it could be discharged outside without any further treatment. Thus, it was proved that the apparatus can sufficiently decolorize dye waste.

Example 18
Batch Decolorization Treatment of Dye-Containing Waste Water by Means of Decolorizing Unit having a Separate Electrolytic Unit Using Acidic Functional Water and a Blue Fluorescent Lamp A decolorizing experiment was conducted in this example by following the procedure of Example 15 except that the halogen lamp as the light irradiation unit 25 was replaced by a blue fluorescent lamp (tradename: FL20S, a product of Toshiba). The intensity of irradiation light, determined by means of a UV power meter (tradename: Model UVA-365, a product of NT Corporation), was 0.057 mW/cm$^2$ at the water surface. After the treatment, the chromaticity of the waste water discharged from the discharge pipe 19, estimated according to JIS K0101, was 2–4. Thus, the treated waste was decolorized to an extent that it could be discharged outside without any further treatment. Thus, it was proved that the apparatus can sufficiently decolorize dye waste.

Comparative Example 2
Batch Decolorization Treatment of Dye-Containing Waste Water by Means of Decolorizing Unit having a Separate Electrolytic Unit Using Acidic Functional Water without Light Irradiation.

A decolorizing experiment was conducted in the same manner as in Example 15 except that light irradiation was not carried out. After the treatment, the chromaticity of the waste water discharged from the discharge pipe 19, estimated according to JIS K0101, was 20–25. With this chromaticity, discharge of the waste water is not allowed.

Example 19
Batch Decolorization Treatment of Dye-Containing Waste Water by Means of Decolorizing Unit having a Separate Electrolytic Unit Using Acidic Functional Water Prepared from Sea Water A decolorizing experiment was conducted in the same manner as in Example 15 except that sea water (sodium chloride concentration of 3.4%) was used in place of the electrolyte solution (sodium chloride 1000 mg/l). Obtained functional water was of pH 2.1, an oxidation-reduction potential of 1150 mV and a residual chlorine concentration of 55 mg/l. After the treatment, the chromaticity of the waste water discharged from the discharge pipe 19, estimated according to JIS K0101, was 2–4. Thus, the treated waste was decolorized to an extent that it could be discharged outside without any further treatment. Thus, it was proved that without adding sodium chloride as an electrolyte the functional water prepared from sea water can decolorize dye waste very cheaply.

Example 20
Continuous Decolorization Treatment of Dye-Containing Waste Water by Means of a Decolorizing Unit Having a Separate Electrolytic Vessel with Supplement of Acidic Functional Water A continuous decolorization of dye-containing waste was conducted by using a unit as shown in FIG. 2. A commercially available functional water generating apparatus (OASYS Bio HALF: tradename, a product of ASAHI GLASS ENGINEERING CO.) was used as the functional water generator 21 of this example, to supply functional water continuously at a flow rate of 200 ml/min. In the electrolyte solution storage tank, water containing sodium chloride in a concentration of 1,000 mg/l was added. The pump 23 was not used in this example because functional water was continuously prepared from tap water. Of the functional water continuously prepared by this electrolyzed water generating apparatus, the pH and the oxidation-reduction potential of the functional water were measured by means of a pH meter (TCX-90i and KP900-2N: tradename, a product of Toko Chemical Laboratories Co., Ltd.) and an electroconductivity meter (TCX-90i and KM900-2N: tradename, a product of Toko Chemical Laboratories), respectively, whereas the chlorine concentration was determined by using a chlorine test paper (ADVANTEC: tradename, a product of Toyo Roshi Kaisha, Ltd.). As a result, pH was 2.1, the oxidation-reduction potential was 1,150 mV and the residual chlorine concentration was 53 mg/l.

On the other hand, the same waste water as used in Example 9 was supplied to the treatment container 22 at a flow rate of 20 ml/min. The treatment container 22 was provided with an agitator 20 to promote the contact between the waste water and functional water. The capacity of the treatment container 22 was made to be 6,600 ml by adjusting the height of the discharge pipe 19 to maintain the retention time of the waste water in the container to about 30 minutes. The treatment container 22 was made of glass to allow direct irradiation of the water to be processed with sunlight, so that the light irradiation unit 25 was not provided. The container was then left standing in a place close to a window and the container was directly irradiated with sunlight on a sunny day. The intensity of the irradiation light, determined by means of a UV power meter (SUV300T: tradename, a product of TORAY), was 0.4–1.2 mW/cm$^2$.

During the five hour operation of the apparatus, the chromaticity of the discharged waste water, estimated according to JIS K0101, was within a range of 3–5. Thus, the treated waste was decolorized to an extent that it could be discharged outside without any further treatment to prove that the apparatus enables continuous decolorization of dye waste.

Comparative Example 3
Continuous Decolorization Treatment of Dye-Containing Waste Water by Means of a Decolorizing Unit Having a Separate Electrolytic Vessel and Supplied with Acidic Functional Water without Light Irradiation A decolorizing experiment was conducted in this comparative example in the same manner as in Example 20 except that the operation was conducted in the dark. The chromaticity of the waste water continuously discharged from the discharge pipe 19, estimated according to JIS K0101, was 22–30. With this chromaticity, discharge of the waste water without further treatment is not allowed.

Example 21
Batch Decolorization Treatment of Dye-Containing Waste Water by Means of a Decolorizing Unit Having a Separate Electrolytic Vessel with Supplement of Mixed Functional Water (Halogen Lamp)

Batch-wise decolorization of a dye-containing waste water was conducted using an apparatus as shown in FIG. 2. An electrolyzed water-generating apparatus (OASYS Bio HALF: tradename, a product of ASAHI GLASS ENGINEERING CO.) was used as the functional water generating unit 21 in this example. An agitator 20 was arranged to promote the contact of the dye-containing waste water and functional water. The inside of the treating container 22 was irradiated by using a halogen lamp (Techno Light KLS-2150: tradename, a product of Kenko). A composite dye waste water of the following composition was artificially prepared and subjected to a decolorizing experiment in this example.

Composition of Dyes:

| | |
|---|---|
| Black Ink Containing Black Azo Pigment in BJ Cartridge BJI-201Bk | 3,000 ppm |
| Yellow Ink Containing Yellow Azo Pigment in BJ Cartridge BJI-201Y | 3,000 ppm |
| Magenta Ink Containing Purple Azo Pigment in BJ Cartridge BJI-201M | 3,000 ppm |
| Cyan Ink Containing Blue Phthalocyanine Pigment in BJ Cartridge BJI-201C | 4,000 ppm |

Subsequently, composite dye waste was supplied to the treating container 22. On the other hand, functional water (1:1 mixture of alkaline and acidic water prepared by running the functional water generating unit 21) was supplied to the treatment container 22 until the waste water was 10 fold diluted. The halogen lamp was then turned on and the content of the container 22 was agitated by the agitator 20 for an hour. The intensity of light measured by means of a UV power meter (SUV300T: tradename, a product of TORAY) was 0.122 mW/cm$^2$ at the water surface. The mixed functional water was characterized by pH 7.1, oxidation-reduction potential 750 mV, and residual chlorine concentration 50 mg/l. After the treatment, the chromaticity of the waste water discharged from the discharge pipe 19, estimated according to JIS K0101, was 2–4. Thus, the treated waste was decolorized to an extent that it could be discharged outside without any further treatment. Thus, it was proved that the above apparatus can be used to satisfactorily decolorize dye wastes.

Example 22
Batch Decolorization Treatment of Dye-Containing Waste Water by Means of a Decolorizing Unit Separated from an Electrolytic Vessel with Supplement of Mixed Functional Water (UV Lamp)

A decolorizing experiment was conducted in this example following the procedure of Example 21 except that the halogen lamp was replaced with a UV lamp having a wavelength peak at 365 nm (UVGL-58: tradename, a product of UVP). The intensity of irradiation light, determined by means of a UV power meter (SUV3000T: tradename, a product of TORAY), was 0.4 mW/cm$^2$ at the water surface. After the treatment, the chromaticity of the waste water discharged from the discharge pipe 19, estimated according to JIS K0101, was 3–5. Thus, the treated waste was decolorized to an extent that it could be discharged outside without any further treatment. Thus, it was proved that the apparatus can sufficiently decolorize dye waste.

Example 23
Batch Decolorization Treatment of Dye-Containing Waste Water by Means of a Decolorizing Unit Having a Separate Electrolytic Vessel with Supplement of Mixed Functional Water (Black Light)

A decolorizing experiment was conducted in this example by following the procedure of Example 21 except that the halogen lamp was replaced by a black light fluorescent lamp (FL108LB 10W: tradename, a product of Toshiba). The intensity of light measured by means of a UV power meter (SUV3005: tradename, a product of TORAY) was 1.2 mW/cm$^2$ at the water surface. After the treatment, the chromaticity of the waste water discharged from the discharge pipe 19, estimated according to JIS K0101, was 3–5. Thus, the treated waste was decolorized to an extent that it could be discharged outside without any further treatment. Thus, it was proved that the apparatus can sufficiently decolorize dye waste.

Example 24
Batch Decolorization Treatment of Dye-Containing Waste Water by Means of a Decolorizing Unit Having a Separate Electrolytic Vessel with Supplement of Mixed Functional Water (Blue Light Fluorescent Lamp)

A decolorizing experiment was conducted in this example by following the procedure of Example 21 except that a blue fluorescent lamp (FL20S B: tradename, a product of Toshiba) was used in place of a halogen lamp. The intensity of light measured by means of a digital UV power meter (Model UVA-365: tradename, a product of NT Corporation) was 0.057 mW/cm$^2$ at the water surface. After the treatment, the chromaticity of the waste water discharged from the discharge pipe 19, estimated according to JIS K0101, was 3–5. Thus, the treated waste was decolorized to an extent that it could be discharged outside without any further treatment. Thus, it was proved that the apparatus can sufficiently decolorize dye waste.

Comparative Example 4
Batch Decolorization Treatment of Dye-Containing Waste Water by Means of a Decolorizing Unit Having a Separate Electrolytic Vessel Using Mixed Functional Water without Light Irradiation A decolorizing experiment was conducted in this comparative example in the same manner as in Example 21 except that the halogen lamp was not turned on. The chromaticity of the waste water discharged through the discharge pipe 19, according to JIS K0101, was 20–28, not allowing the treated waste water to be discharged outside without further processing.

Example 25
Batch Decolorization Treatment of Dye-Containing Waste Water by Means of a Decolorizing Unit Having a Separate Electrolytic Vessel Using Mixed Functional Water Prepared from Sea Water A decolorizing experiment was conducted in the same manner as in Example 21 except that sea water (salt concentration: 3.4%) was electrolyzed in place of a sodium chloride solution. The prepared mixed functional water was characterized by pH value of 7.2, oxidation-reduction potential of 750 mV and residual chlorine concentration of 42 mg/l. After the decolorizing treatment, the chromaticity of the treated waste water discharged from the discharge pipe 19, according to JIS K0101, was 3–5, so that the treated waste water was decolorized and could be discharged to the outside without further treatment. Thus, it was proved that without adding sodium chloride as an electrolyte the functional water prepared from sea water can decolorize dye waste very cheaply.

Example 26
Continuous Decolorization Treatment of Dye-Containing Waste Water by Means of a Decolorizing Unit Separated from an Electrolytic Vessel and Supplied with Mixed Functional Water A continuous decolorizing process was conducted on dye-containing waste water by using a unit as shown in FIG. 2. A commercially available functional water generating apparatus (OASYS Bio HALF: tradename, a product of ASAHI GLASS ENGINEERING CO.) was used as the functional water generator 21 to produce acidic functional water (pH 2.1, oxidation-reduction potential 1,150 mV, chlorine concentration 54 mg/;) and basic functional water (pH 11.5, oxidation-reduction potential −850 mV, chlorine concentration 10 mg/l), which were supplied at a flow rate of 100 ml/min and mixed in a 1:1 ratio to produce mixed functional water (pH 7.1, oxidation-reduction potential 620 mV, chlorine concentration 42 mg/l). The mixed functional water was then supplied to the treatment container 22. The pump 23 was not used in this example because functional water was continuously prepared from tap water.

On the other hand, the same waste water as used in Example 9 was supplied to the treatment container 22 at a flow rate of 20 ml/min by using a pump 17. The treatment container 22 was provided with an agitator 20 to promote the contact between the waste water and functional water. The capacity of the treatment container 22 was made to be 6,600 ml by adjusting the height of the discharge pipe 19 to maintain the retention time of the waste water in the container at about 30 minutes. The treatment container 22 was made of glass to allow direct irradiation with sunlight of the water to be treated, so the light irradiation unit 25 was not tuned on. The container was then left standing in a place close to a window and the container was directly irradiated with sunlight on a sunny day for five hours. The intensity of the irradiation light, determined by means of a UV power meter (SUV300T: tradename, a product of TORAY), was 0.4–1.2 mW/cm$^2$.

The chromaticity of the continuously discharged waste water, estimated according to JIS K0101, was within a range of 5–8. Thus, the treated waste was decolorized to an extent that it could be discharged outside without any further treatment, proving that the apparatus enables continuous decolorization of dye waste.

Comparative Example 5
Continuous Decolorization Treatment of Dye-Containing Waste Water by Means of a Decolorizing Unit Having a Separate Electrolytic Vessel Using Mixed Functional Water without Light Irradiation A decolorizing experiment was conducted in this comparative example by following the procedure of Example 26 except that light irradiation was not carried out. The chromaticity of the waste water discharged from the container, estimated according to JIS K0101, was between 25 and 39, not allowing the treated waste water to be discharged outside without further processing.

What is claimed is:

1. A process for decolorizing a colored liquid comprising the steps of:
   a step of providing a functional solution obtained by electrolyzing an aqueous solution containing an electrolyte including at least one of sodium chloride and potassium chloride; and
   a step of decolorizing a colored liquid by bringing the colored liquid into contact with the functional solution under irradiation with light having a wavelength of 300 nm or more, wherein chlorine radicals for decolorizing the colored liquid are generated in the functional solution under irradiation with the light, wherein the light is irradiated continuously during the decolorizing step.

2. The process according to claim 1, wherein the functional solution is a mixed functional solution obtained by mixing acidic water produced in the proximity of the anode and basic water produced in the proximity of a cathode by electrolysis of the aqueous solution containing an electrolyte.

3. The process according to claim 2, wherein the mixed functional solution is obtained by mixing the acidic water and the basic water in a ratio of one to less than one.

4. The process according to claim 1, wherein the functional solution is an acidic solution generated in the proximity of the anode by electrolysis of the aqueous solution containing an electrolyte.

5. The process according to claim 4, wherein the functional solution has a chlorine concentration of 2–200 mg/l, before coming into contact with the colored water.

6. The process according to claim 4, wherein the functional solution is characterized by a pH of 1–4, an oxidation-reduction potential of 800–1500 mV and a chlorine concentration of 5–150 mg/l.

7. The process according to claim 6, wherein a working electrode is a platinum electrode, and a reference electrode is a silver-silver chloride electrode.

8. The process according to claim 4, wherein the functional solution is characterized by a pH of more than 4 and less than 10, an oxidation-reduction potential of 300–1100 mV and a chlorine concentration of 2–100 mg/l.

9. The process according to claim 8, wherein a working electrode is a platinum electrode, and a reference electrode is a silver-silver chloride electrode.

10. The process according to claim 1, wherein the light comprises light in a wavelength range of 300–500 nm.

11. The process according to claim 10, wherein the wavelength range is 350–450 nm.

12. The process according to claim 1, wherein the light has an irradiation intensity between 10 $\mu W/cm^2$ and 10 $mW/cm^2$.

13. The process according to claim 12, wherein the irradiation intensity is between 50 $\mu W/cm^2$ and 5 $mW/cm^2$.

14. The process according to claim 1 further comprising the steps of:
   providing a container equipped with a pair of electrodes and a power source to apply a voltage between the electrodes, the container containing the aqueous solution containing an electrolyte, and
   supplying the colored liquid at least in the proximity of an anode of the electrodes.

15. The process according to claim 14, wherein the container is provided with a diaphragm between the electrodes in order to prevent mixing of the functional solution produced in the proximity of the anode and the functional solution produced in the proximity of the cathode by said electrolysis.

16. The process according to claim 15, wherein the diaphragm is an ion exchange membrane or a fine porous membrane.

17. The process according to claim 14, wherein the colored liquid is supplied in the proximity of the anode.

18. The process according to claim 17, wherein the colored liquid is supplied after production of the functional solution in the proximity of the anode.

19. The process according to claim 1, further comprising the steps of:
   supplying said functional solution produced by electrolyzing the aqueous solution in a container, and
   supplying the colored liquid into the container,
   wherein the irradiation of the functional solution and the colored liquid occurs in the container.

20. The process according to claim 1, wherein the colored liquid is at least one of a dye solution and waste water from a dyeing industry.

21. The process according to claim 1, wherein the colored liquid is a waste ink of an ink jet printer.

22. The process according to claim 1, wherein the colored liquid contains a dye.

23. The process according to claim 22, wherein the dye is selected from the group consisting of azo dyes, anthraquinone dyes, phthalocyanine dyes, indigoid dyes, carbonium dyes, quinone-imine dyes and methine dyes.

24. The process according to claim 22, wherein the dye is at least one of azo dyes and phthalocyanine dyes.

25. A process for decolorizing a colored liquid comprising the steps of:
   a step of providing a functional solution obtained by electrolyzing an aqueous solution containing an electrolyte which produces hypochlorous acid or hydrochlorite ions; and
   a step of decolorizing a colored liquid by bringing the colored liquid into contact with the functional solution under irradiation with light having a wavelength of 300 nm or more, wherein chlorine radicals for decolorizing the colored liquid are generated in the functional solution under irradiation with the light, wherein the light is irradiated continuously during the decolorizing step.

26. The process according to claim 25, wherein the functional solution is an acidic solution generated in the proximity of the anode by electrolysis of the aqueous solution containing an electrolyte.

27. The process according to claim 25, wherein the functional solution has a chlorine concentration of 2–200 mg/l, before coming into contact with the colored water.

28. The process according to claim 25, wherein the wavelength of the light is in a range of from 350 nm to 450 nm.

29. A process for decolorizing a colored liquid comprising the steps of:
   a step of providing a solution containing hypochlorous acid or hypochlorite ions; and
   a step of decolorizing a colored liquid by bringing the colored liquid into contact with the solution under irradiation with light having a wavelength of 300 nm or more, wherein chlorine radicals for decolorizing the colored liquid are generated in the solution under irradiation with the light,
   wherein the light is irradiated continuously during the decolorizing step.

* * * * *

UNITED STATES PATENT AND TRADEMARK OFFICE
CERTIFICATE OF CORRECTION

PATENT NO.   : 6,589,396 B2
DATED        : July 8, 2003
INVENTOR(S)  : Akira Kuriyama et al.

It is certified that error appears in the above-identified patent and that said Letters Patent is hereby corrected as shown below:

Column 3,
Line 3, "=,irradiation" should read -- irradiation --.

Column 4,
Line 35, "$HCO_3\_,$" should read -- $HCO_3^{--}$, --.
Line 53, "a agitating" should read -- an agitating --.

Column 9,
Line 41, "residual the" should read -- the residual --.

Column 16,
Line 28, "54 mg/;)" should read -- 54 mg/1) --.

Signed and Sealed this

Twenty-third Day of December, 2003

JAMES E. ROGAN
*Director of the United States Patent and Trademark Office*